United States Patent [19]

Major

[11] 3,976,400

[45] Aug. 24, 1976

[54] GRADIENT PUMP APPARATUS

[75] Inventor: Emery Major, Larkspur, Calif.

[73] Assignee: Altex Scientific, Inc., Berkeley, Calif.

[22] Filed: Mar. 3, 1975

[21] Appl. No.: 554,407

[52] U.S. Cl. .................................. 417/248; 417/270; 417/287; 417/429; 92/13.3; 92/129

[51] Int. Cl.[2] ........................ F04B 1/12; F04B 23/04; F01B 31/14; F16J 1/10

[58] Field of Search ........... 417/269, 270, 248, 286, 417/287, 426, 429; 169/14; 92/13.3, 129

[56] References Cited

UNITED STATES PATENTS

| | | | |
|---|---|---|---|
| 1,933,081 | 10/1933 | Stephan | 417/269 |
| 2,027,076 | 1/1936 | Volliman | 417/269 |
| 2,215,827 | 9/1940 | Ditto | 417/269 |
| 2,439,879 | 4/1948 | Allen | 417/269 |
| 2,556,426 | 6/1951 | Hoffer | 417/248 |
| 3,131,855 | 5/1964 | Kocher | 417/248 |

*Primary Examiner*—William L. Freeh
*Assistant Examiner*—G. P. La Point
*Attorney, Agent, or Firm*—Theodore J. Bielen, Jr.; Richard Esty Peterson

[57] ABSTRACT

A high pressure positive displacement gradient pump for two flowable materials utilizing two reciprocating pistons with the pair of pistons pumping in an overlapping reasonably pulse free manner. The gradient of the two flowable materials is created by adjustment of the stroke of each piston. Streams for the pair of pistons are combined and mixed in a mixing chamber. A third pair of pistons may deliver the mixed stream at high pressure to the desired location.

12 Claims, 7 Drawing Figures

-2-
-3-
-4-
-5-
10
12
14
16
18
20
22
24
26
28
30
32
188Y
190Y
191Y
192X
192Y
194X
194Y
196X
196Y
200X
200Y
202X
204X
204Y
206
224
226
228
230
232
236
238
242

GRADIENT PUMP APPARATUS

BACKGROUND OF THE INVENTION

The present invention relates to a novel apparatus for pumping two separate flowable materials at a constant rate of flow according to a predetermined changing ratio or a gradient. The present invention is particularly useful for, although not limited to, delivering a gradient of two solvents to a liquid chromatographic column to accomplish the analysis of a liquid sample.

More specifically, a liquid chromatographic column contains packing of finely divided particles for solute separation of the liquid sample. Typically, the particulate size of the packing is about 5 microns. To overcome the resistance to flow established in a packed column requires a pulse free, high pressure pump.

Another problem encountered is the different solubility characteristics of the solutes of a liquid sample. The object of efficiency in analyzing the liquid sample dictates that two solvents be used to elute characteristically different solutes of a liquid sample through the packed column. For example, a polar solvent would wash a polar liquid solute through the packed column at a satisfactory rate, while nonpolar solutes would be carried at an undesirably slow rate. Therefore, a second non-polar solvent is pumped at predetermined gradient with respect to the polar solvent; a technique known in the art as "gradient elution analysis". This technique allows the polar and non-polar solutes to be transported through the packed column within a reasonable time span.

Presently, a typical gradient delivery system uses two pumps, each having a motor and a means to program the flow rate of each pump's output. This method entails the difficult coordination of two power sources. The apparatus for such a device tends to be bulky and difficult to fit into a laboratory space.

SUMMARY OF THE INVENTION

In accordance with the present invention, a gradient pump apparatus is provided in its most basic embodiment, having two reciprocating pistons, each piston pumping a solvent in a lag free manner. The flow pattern displays substantially reduced flow of the output streams. The gradient is produced by inversely adjusting the stroke of the pistons. The pump may also take the form of an apparatus having two pairs of reciprocating, side-by-side pistons to pump two solvents, each piston pair pumping a single solvent, in a lag free manner resulting in a reasonably pulse free output of each pair of pistons. The two streams may be combined within a mixing chamber and travel to a third pair of pistons which delivers the combined solvents wherever required at higher pressure; for instance, to a packed column of a liquid chromatograph. Power for the pump derives from a single source and the reciprocating overlapping flow pattern of each pair of pistons originates from a drive shaft having two cams.

The first and second pair of pistons ride on a first cam surface and the third pair of pistons ride on a second cam surface. Adjustment of the stroke of the first pair of pistons in an inverse relationship to the second pair of pistons produces the gradient of the two solvents. The adjustment of the stroke may be effected by any mechanical means and is easily controlled by a standard servo system, well known in the art.

The operation of the device results in a pulse free high pressure continuous flow stream of two solvents in a predetermined gradient. Thus, two flowable materials having different characteristics can be combined at a variable ratio easily and efficiently.

Accordingly, it is an object of the present invention to provide an efficient, compact, and reliable high pressure gradient pump.

Another object of the invention is to provide a pulse free gradient pump which will deliver two solvents to a packed column of a liquid chromatograph.

Yet another object of the present invention is to provide a gradient pump using a single source of power and a single rotatable shaft.

Still another object of the present invention is to provide a gradient pump which produces the gradient by variation of the stroke of two pairs of pistons. The pistons deliver the flowable materials at the proper flow rate and at relatively high pressure to overcome the resistance to flow found in a packed column or the like.

The invention possesses other objects and advantages, especially as concerns particular features and characteristics thereof, which will become apparent as the specification continues.

DESCRIPTION OF THE PREFERRED EMBODIMENTS

Figure 1:
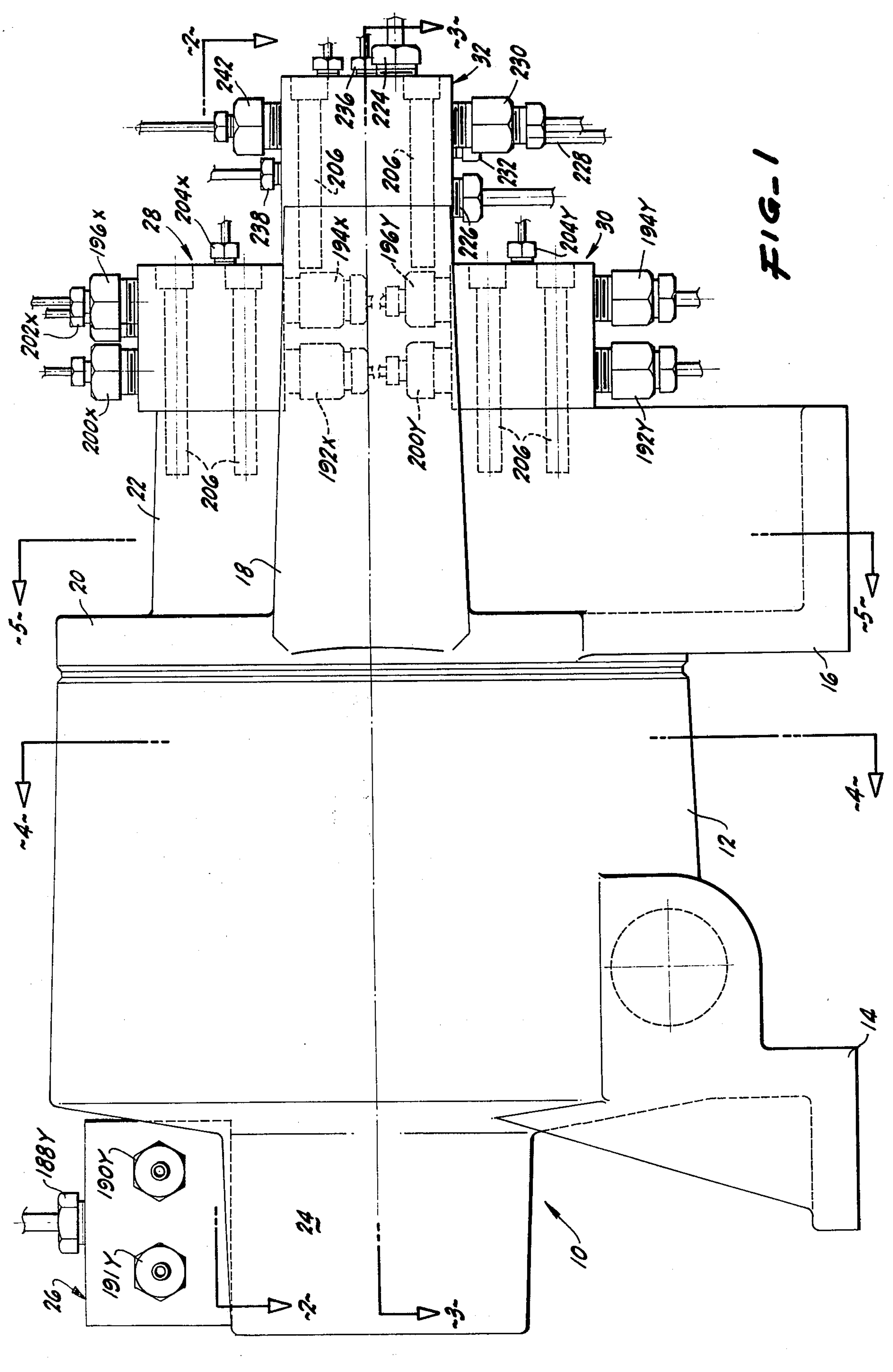
FIG. 1 is a partially broken side elevational view of the apparatus.

The apparatus, denoted by the numeral 10 in FIG. 1, comprises a housing 12 supported by stand 14 and a U-shaped support member 16. A pair of laterally oriented support arms 18 are integrally mounted on plate 20 which is itself affixed to housing 12. "O" ring 21 serves as a gasket between plate 20 and housing 12, FIG. 2. Stub arms 22, horizontally disposed, mount on plate 20. Support member 24 extends from housing 12 on the opposite side of housing 12 with respect to arms 18, stub arms 22, and U-shaped member 16.

Figure 2:
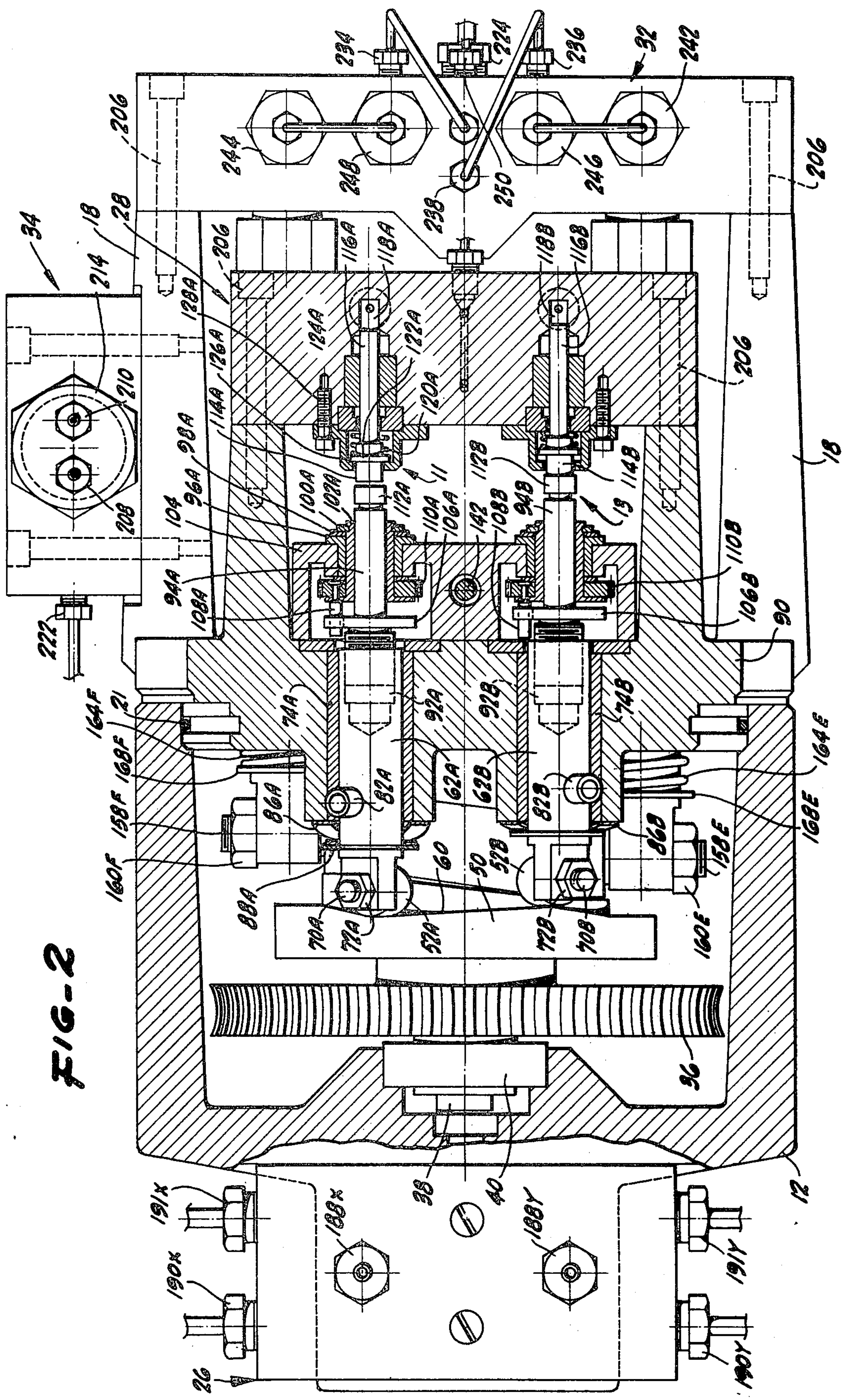
FIG. 2 is a partially broken sectional view along line 2—2 of FIG. 1.

Coarse filter block 26 sits on support member 24, as shown in FIGS. 1 and 2. Lateral arms 18 support high pressure manifold 32 and stub arms 22 support first low pressure manifold 28. Second low pressure manifold 30 securely mounts to U-shaped member 16.

Figure 3:
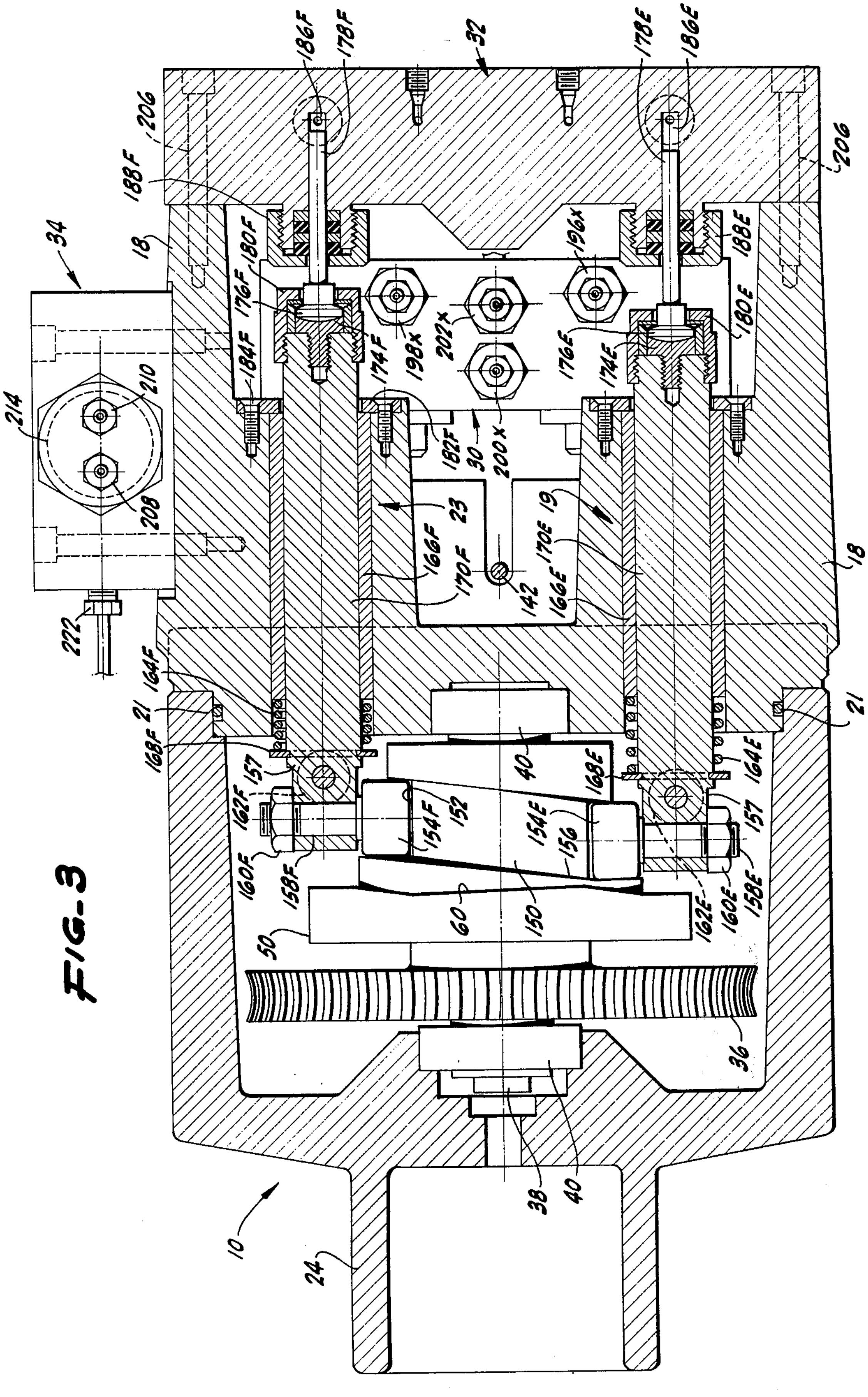
FIG. 3 is a sectional view along line 3—3 of FIG. 1.

Mixing chamber 34 affixes to one of the lateral arms 18, as shown in FIG. 3.

Figure 4:
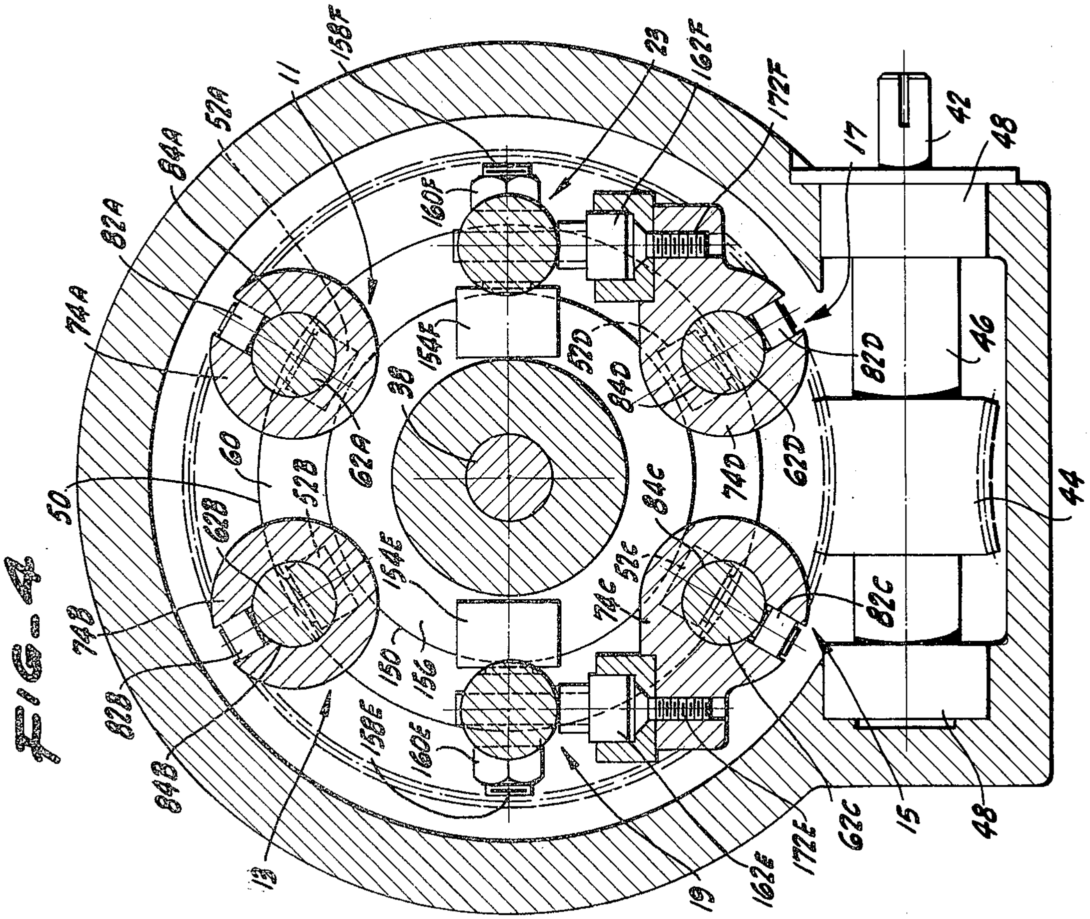
FIG. 4 is a sectional view along line 4—4 of FIG. 1.

Pump apparatus 10 may be driven by any source of power which turns gear wheel 36, which is secured to driven shaft 38 having bearings 40, as is well known in the art, shown in FIGS. 2, 3, and 4. For instance, driving shaft 42 may be rotated by an electric motor (not shown). Worm gear 44, circumjacently affixed to driving shaft 42 by sleeve 46, meshingly engages gear wheel 36 and turns the same at a constant rate. Bearings 48 surroundingly engage shaft 42 and sleeve 46.

Each low pressure piston mechanism is denoted in its entirety by the numerals 11, 13, 15, and 17. The letter A corresponds to elements of low pressure piston mechanism 11, B to low pressure piston mechanism 13, C to low pressure piston mechanism 15, and D to low pressure piston mechanism 17. Reference to common elements will be made without reciting the letters.

Circumjacently affixed to driven shaft 38 is cam 50. As shown in FIG. 2, and in phantom in FIG. 4, cam followers 52 ride on cam surface 60 of cam 50. For example, the cam followers may be spherical, cylindrical, and the like. The present embodiment shows them to be of cylindrical configuration rollingly engaging cam surface 60. Each cam follower is affixed to plungers 62 with any suitable means, such as bolts 70 and nuts 72. Cylinders 74 contain plungers 62 such that the plungers slidably reciprocate therein. Cam follower retainers 82 fit within sleeve recesses 84 to prevent rotation of the plungers 62 on their long axis during reciprocation, as shown in FIGS. 2 and 4. Flat springs 86 affixed to housing casting 90 exert a constant force upon collars 88 secured to plungers 62; thus biasing each cam follower 52 against the cam surface 60, as shown in FIG. 2.

For each low pressure or adjustable stroke piston mechanism 11, 13, 15, 17, threaded bores 92 are provided within the plunger end portions opposite to the cam followers 52. Rams 94, having a threaded end portion, engage the threaded bores 92 such that the rams 94 may axially move in or out of the threaded bores 92. Bushings 96, washers 98, snap rings 100 and hubs 102 contain the rams 94 within housing member 104. Discs 106 are circumjacently fixed to rams 94; each disc having a pin 108 through its edge portion. Gear collars 110 affixed to the circumference of rams 94, rotate with the rams 94. The interconnection of collars 110 and discs 106 via pin 108 causes the rams 94 to axially rotate with a turn of the collars 110. Plungers 62, rams 94, and pistons 116 are axially aligned when in operation. Heads 112 convey the axial motion of the rams 94 to piston blocks 114 by butting the same. Thus, pistons 116, preferably constructed of sapphire, move axially within chamber 118. Helical springs 120 force the pistons 116 back to the starting position at the termination of each stroke by bearing on collars 122, which are firmly affixed to piston blocks 114. The fluid being pumped through chambers 118 is prevented from flowing toward the helical springs 120 by the packing gland 124. Flanges 126 hold the helical springs 120 and packing glands 124 to the low pressure manifolds 28 and 30, the internal flow patterns of which will be discussed hereafter. Fasteners 128 fix flanges 124 to low pressure manifolds 28 and 30.

In operation, the cams 52 ride on the cam surface 60 as cam 50 rotates. Plungers 62 and rams 94 reciprocate according to the contour of cam surface 60. The contour shape causes each pair of low pressure piston mechanisms to pump in an overlapping or lag free manner. That is, one piston will begin its output stroke before the other piston ends its output stroke. As heretofore discussed, the invention may operate with a single pair of low pressure pistons, in which case, only cam followers 52B and 52C would ride on cam surface 60. Ram heads 112 butt piston blocks 114 causing pistons 116 to pump fluids from chambers 118. The stroke of pistons 116 may be adjusted from zero to full length by setting the gap between ram heads 112 and piston blocks 114. For example, full stroke of a low pressure piston would require a zero gap, and a zero stroke of a piston would require a gap equal to the length of travel of the rams 94. After a stroke has been completed, helical springs 120 return the pistons 116 to their starting position and draw flowable material into chambers 118 at the same time in preparation for the following stroke. Cam 50, thus, creates an overlapping pumping action of low pressure piston mechanism pairs 11 and 13, and pairs 15 and 17. This eliminates unreasonable pulsing outflow of combined flow of a pair of pistons.

Figure 5:
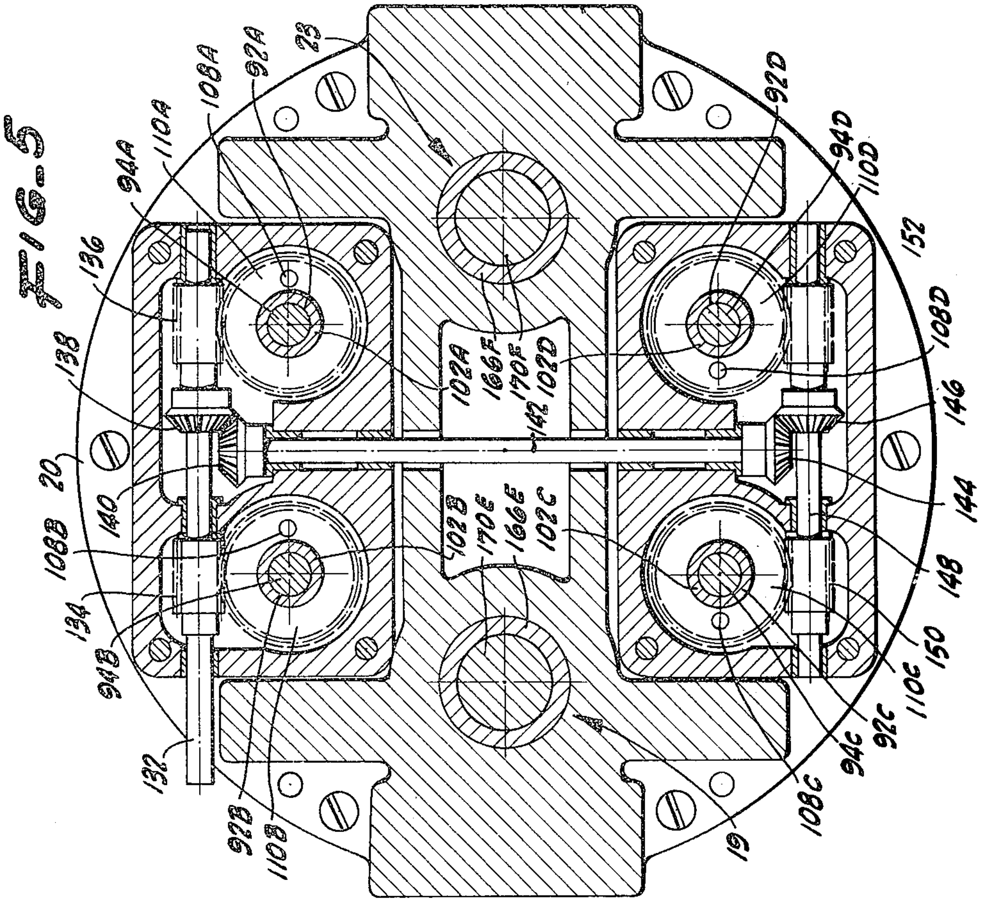
FIG. 5 is a sectional view along line 5—5 of FIG. 1.

As shown in FIG. 5, stroke adjustment shaft 132 for the low pressure piston mechanisms 11, 13, 15, and 17 extends generally horizontally and transversely to the axes of the rams 94. Worm gears 134 and 136, affixed to shaft 132, engage the gear collars 110A and 110B which are coaxially fixed to the rams 94A and 94B. Miter gear 138, fixed to shaft 132, engages miter gear 140 which is affixed to vertical shaft 142 which has miter gear 144 fixed to its end opposite to miter gear 140. Vertical shaft 142 rotates in either direction about its long axis. Miter gear 144 meshingly engages miter gear 146 which circumjacently affixes to horizontal shaft 148. Worm gears 150 and 152 coaxially affixed to shaft 148 engage gear collars 110C and 110D on rams 94C and 94D.

In the case where only one pair of low pressure piston mechanisms is employed, for example, mechanisms 13 and 15, worm gears 136 and 152 would not be used.

In the preferred embodiment, the stroke of low pressure mechanism pairs 11, 13, 15 and 17 are varied by turning shaft 132. Although gear pitch may be varied to any suitable value, the worm gears' and miter gears' pitch are preferably predetermined such that a 360° turn of shaft 132 will vary the stroke of one pair of piston mechanisms from zero to full and vice versa for the other pair. More specifically, when shaft 132 is partially turned to increase the stroke of pistons 116A and 116B, the worm gears 134 and 136 turn collar gears 110A and 110B such that pins 108A and 108B interconnected to discs 106A and 106B turn the same. The threaded ends of rams 94A and 94B move outwardly from threaded bores 92A and 92B, thus positioning each ram head 112A and 112B equally closer to piston blocks 114A and 114B and equally decreasing each gap therebetween. When rams 94A and 94B butt, pistons 116A and 116B, as a result of the cam action, heretofore described, pistons 116A and 116B pump more fluid than before the adjustment of shaft 132 since the length of the stroke of each piston 116A and 116B has equally increased. Simultaneously, the stroke of each piston 116C and 116D has equally decreased since the worm and miter gears have caused the threaded ends of rams 94C and 94D to move away from pistons 116C and 116D, thus increasing the gap between ram heads 112C and 112D (not shown).

As previously discussed, where only two piston mechanisms 13 and 15 (one pair) are used, the turning of shaft 132 will increase or decrease the stroke of pistons 116B and 116C. Worm gear 134 turns gear 110B such that pin 108 turns disc 108B which, in turn, rotates ram 94B in or out to decrease or increase the stroke of piston 116B. Again, the increase or decrease of the stroke of piston 116B inversely and equally changes the stroke of piston 116C. As an alternate embodiment of the stroke adjustment mechanism, the pitch direction of worm gears 134 and 136 may be constructed opposite one another. In this case, piston mechanisms 11 and 13 would be employed and the stroke adjustment would proceed by turning shaft 132. As similarly described heretofore, the change of the stroke of piston mechanism 11 would be inverse to the stroke of piston mechanism 13. However, the total volume output of the two pistons 116A and 116B would be constant.

The total volume of flowable material pumped by low pressure piston mechanisms 11, 13, 15, and 17 will be constant, but the proportion of the total volume of flowable material pumped by piston mechanism pair 11 and 13, each pumping equal volumes, will be greater than the corresponding proportion of the total volume of flowable material delivered by pistons mechanism pair 15 and 17. An opposite turn of the adjustment shaft 132 will produce a decreasing proportion of the two volumes. As can be seen, a gradient between the flowable material pumped by piston mechanisms 11 and 13 and another flowable material pumped by piston mechanisms 15 and 17 may be effected.

This system easily lends itself to automatic programming since adjustment shaft 132 may be attached to a servo mechanism or null circuit (not shown) to vary the low pressure piston mechanisms' strokes with respect to time.

FIGS. 3 and 4 depict the constant stroke or high pressure pistons 19 and 23. The letters E and F correspond to elements of the high pressure pistons mechanisms 19 and 23, respectively. Cam followers 154 ride surface 156 of channel 152 on cam 150. Channel 152 tends to prevent cam followers 154 from moving off the cam surface 156. Cam followers 154 mount to casting member 156 with any suitable means, such as bolts 158 and nuts 160. Cam follower retainers 162 preclude rotation of cam followers 154 out of the channel 152. Helical springs 164 interposed between sleeves 166 and collars 168, affixed to plungers 170, hold the plungers 170 and cam followers 154, thereattached, to the cam surface 156. Threaded fittings 172 secure retainers 162 to the housing, as shown in FIG. 4. The ends of plungers 170 comprise a concave seat 174 which pressingly engages a convex face or ferrule 176. The concave surface aligns the axes of plungers 170 and pistons 178. Threaded sleeves 180 contain the seat and ferrule. Rings 182 secure sleeves 166 and are attached to arms 18 with fasteners 184. Flowable material within chambers 186 is isolated by packing glands 188 which, preferably, are constructed in sandwich form with alternating layers of Teflon and stainless steel surrounded by a threaded nut.

In operation, the high pressure piston mechanisms 19 and 23 pump flowable material in a reciprocating manner. Cam followers 154, riding on cam surface 156, transmit axial motion to plungers 170 which, in turn, move pistons 178. Thus, flowable material is pumped from chambers 186. As heretofore discussed, with reference to the pairs of low pressure piston mechanisms, the pair of high pressure piston mechanisms pump in overlapping relationship; i.e., with a reasonably pulse-free output. The pressure of the output of the high pressure pistons is on the order of 10,000 psi.

Figure 7:
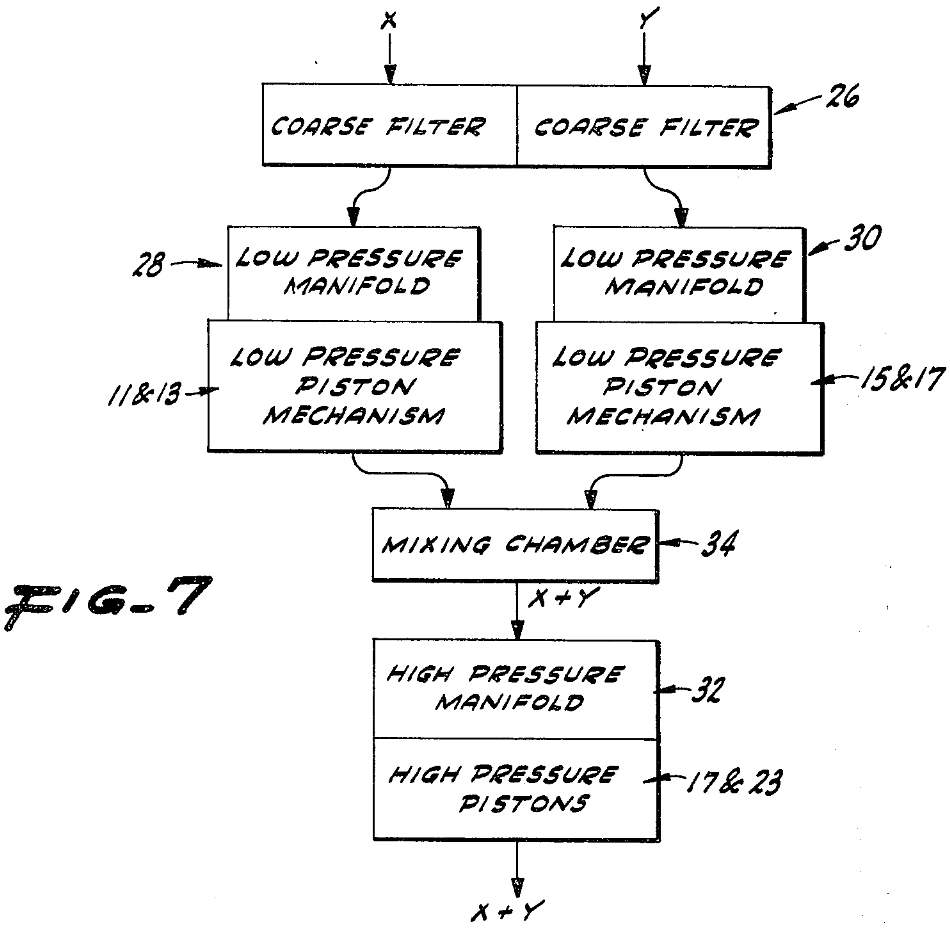
FIG. 7 is a schematic view of the apparatus.

With reference to FIGS. 2 and 7, two flowable materials, X and y, may be pumped in a gradient, as heretofore mentioned. The letters X and Y denote the flow elements associated with flowable material X and flowable material Y. For example, two solvents, X and Y, enter coarse filter block 26, as shown by labeled arrows, from two reservoirs (not shown). Specifically, the X and Y solvents enter coarse filter 188 and exit fittings 190 and 191. Coarse filters 188 are preferably Teflon membranes with a pore size of about 60 microns. Fittings are preferably threaded, stainless steel nuts of hexagonal configuration.

From the coarse filter block 26, solvents X and Y flow to low pressure manifolds 28 and 30, respectively, FIGS. 1, 2, and 3. First low pressure manifold 28 corresponds to the flowable material pumped by a pair of low pressure piston mechanisms 11 and 13. Second low pressure manifold 30 corresponds to a pair of low pressure piston mechanisms 13 and 17.

In the case of two pistons, low pressure manifolds 28 and 30 would handle the output of low pressure piston mechanisms 13 and 25 or 11 and 13, as previously discussed.

High pressure manifold 32 corresponds to a pair of high pressure piston mechanisms 19 and 23. For example, solvent X flows to first low pressure manifold 28 and solvent Y flows to second low pressure manifold 30 for pumping by the aforementioned low pressure piston mechanisms at a predetermined gradient. Output streams of solvents X and Y may be combined in mixing chamber 34 and piped to high pressure manifold 32 for pumping by the high pressure piston mechanisms 19 and 23.

Low pressure manifolds 28 and 30 have cartridge filter fittings 192 and 194 receiving the split streams from the coarse filter block 26. In other words, there are two streams of solvent X and two streams of solvent Y. Piston chambers 118A and 118B, in the present example, handle the two solvent X streams while piston chamber 118C and 118D handle the two solvent Y streams. Where only two pistons are employed, the two solvents X and Y travel to chambers 118A and 118B or 118B and 118C, with reference to the previous discussion regarding the use of two pistons and only one stream of solvent X and one stream of solvent Y come from coarse filter block 26. On either side of the chamber is a check valve (not shown), as is well known in the art, acting in opposition to each other. For example, double sapphire seat, double ball, spring loaded, check valves are preferably employed. Cartridge filters within fittings 192 and 194 are preferably porous stainless steel with a porosity of 2 to 5 microns. Solvents X and Y are pumped by pistons 116 and exit through fittings 196 and 198. The streams then enter cartridge filter fittings 200 and 202, with cartridge filters similar to those of fittings 192 and 194. Each solvent stream combines and exits fitting 204, as shown by flow arrows in FIGS. 1 and 3.

Fasteners 206 secure the three manifolds to the arms 18 and stub arms 22 as heretofore mentioned. Fittings 192, 194, 196, 198, 200, 202, and 204 may be mounted by any means; preferably, they are threaded into the manifolds.

Figure 6:
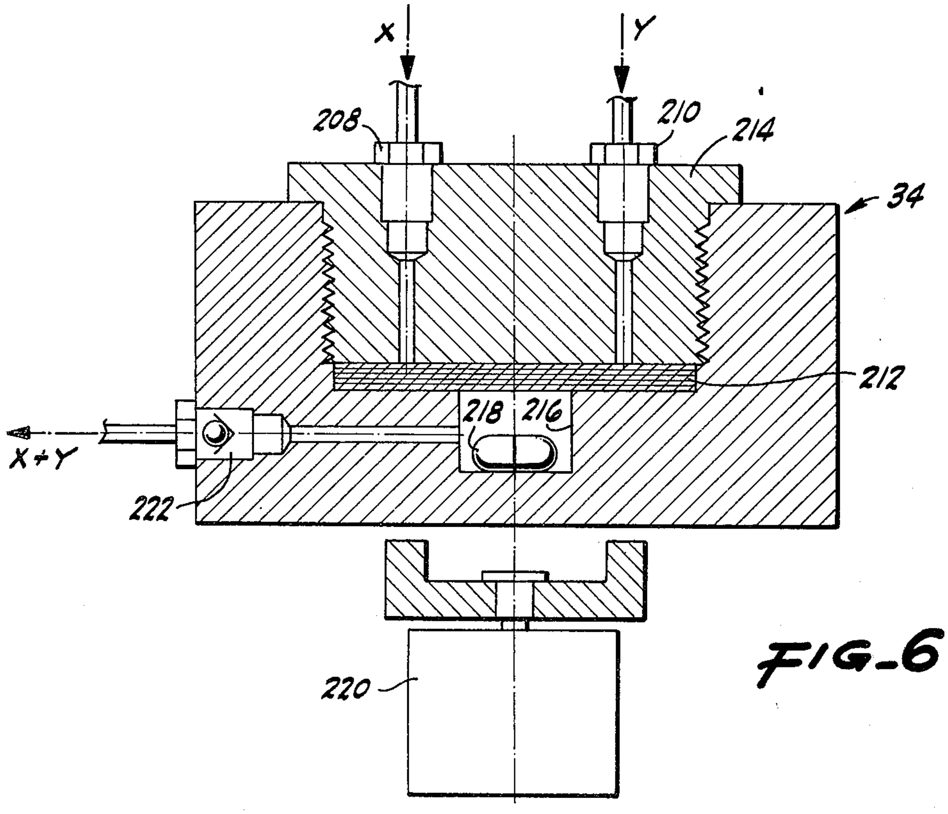
FIG. 6 is a cross-sectional view of the mixing chamber.

Mixing chamber 34, when employed, receives the proper proportions of solvents X and Y through fittings 208 and 210, as shown in FIGS. 3 and 6. The two solvent streams pass through filter 212 beneath threaded member 214 and combine in chamber 216. Dipole bead 218 within chamber 216 mixes the two solvents upon rotation of mixer 220 therebelow, as is well known in the art. The thoroughly mixed stream of X and Y solvent travels through check valve 222 to the high pressure manifold 32.

As shown in FIGS. 1 and 2, the combined streams enter fitting 224 and exit fittings 226 and 228 as split streams of two equal parts. One stream enters fitting 230 and the other fitting 232. The streams arrive in high pressure piston chambers 186E and 186F and are pumped by high pressure pistons 178 via a double check valve arrangement heretofore described for the low pressure piston chambers 118. The streams exit fittings 234 and 236 and pass through cartridge filter fittings 238 and 240, of the same type as found in the low pressure manifolds. The streams again exit through fittings 242 and 244, re-enter the manifold through fittings 246 and 248, and exit as a combined stream at high pressure through fitting 250.

While in the foregoing specification embodiments of the invention have been set forth in considerable detail for the purpose of making a complete disclosure thereof, it will be apparent to those skilled in the art that numerous changes may be made in such details without departing from the spirit and principles of the invention.

What is claimed is:

1. A positive displacement gradient pump for a first and second flowable material comprising:

a. rotatable shaft operated by a source of power b. first piston means for pumping the first flowable material comprising a pair of piston mechanisms;

c. second piston means for pumping the second flowable material comprising a pair of piston mechanisms each of said first and second piston mechanisms including a piston, piston chamber, for guiding said piston's axial movement, ram axially aligned with said piston, plunger axially aligned with said piston, said ram connected to the proximal end portion of said plunger such that axial movement of said distal end of said plunger causes said ram to tap said piston resulting in axial movement of said piston within said piston chamber.

d. first cam means, including a first cam rotated by said shaft, for operating said first and second piston means, and;

e. means for changing the volume output of said first and second piston means such that the total volumne output from said first and second piston means is constant, said means including a threaded bore on the proximal end portions of each of said plungers, each of said rams having a threaded end portion threadingly engaging said threaded bores, said rams adapted to be axially positioned within said threaded bores, and means to selectively position each pair of rams within said threaded bore associated with said first and second pairs of piston mechanisms such that the axial movement of said pair of rams upon rotation of said first cam causes said associated pairs of pistons to reciprocally travel within the range of zero to full stroke and the total stroke of said pistons in constant.

2. The pump of claim 1 which additionally comprises a mixing chamber combining the output streams of said first flowable material and said second flowable material from said first and second piston means, said mixing chamber discharging the combined streams.

3. The pump of claim 1 which additionally comprises third piston means for pumping the total volume output from said first and second piston means and, second cam means rotated by said rotatable shaft for operating said third piston means.

4. The pump of claim 1 in which said means for changing the volume output of said first and second pairs of piston mechanisms comprises a stroke adjustment for each pair of said first and second pairs piston mechanisms.

5. The pump of claim 3 in which said third piston means comprises a third pair of piston mechanisms.

6. The pump of claim 4 which additionally comprises a mixing chamber combining the output streams of said first flowable material and said second flowable material from said first and second pairs of piston mechanisms, said mixing chamber discharging the combined streams.

7. The pump of claim 6 in which additionally comprises a third pair of piston mechanisms for pumping the total volume output from said first and second piston means and, second cam means rotated by said rotatable shaft for operating said third pair of piston mechanisms.

8. The pump of claim 1 in which said first cam means further includes a cam follower connected to the distal end portion of said plunger, spring means urging said cam follower to engage the surface of said cam; said cam means operating each of said pistons in reciprocal motion within said respective piston chambers and each pair of pistons in overlapping strokes to pump each of the flowable materials.

9. The pump of claim 9 in which said means to selectively position said pairs of rams includes first shaft including a first and second worm gear and first miter gear, each of said rams having a gear collar adapted for changing the position of said rams within each of said bores, said first and second worm gears meshingly engaging said gear collars associated with said first pair of rams; second shaft having a second and third miter gear at the end portions thereon, said second and first miter gears meshingly engaging each other; third shaft including third and fourth worm gears meshingly engaging said gear collars associated with said second pair of rams, said third and fourth miter gears meshingly engaging each other such that a turn of said first shaft selectively increases and decreases the stroke of said pairs of pistons such that the total stroke of said pistons is constant.

10. The pump of claim 1 which additionally comprises a mixing chamber combining the output streams of said first flowable material and said second flowable material from said first and second pairs of piston mechanisms, said mixing chamber discharging the combined streams.

11. The pump of claim 9 which additionally comprises a third pair of pistons pumping the combined streams discharged from said mixing chamber and second cam means rotated by said rotatable shaft to operate said third pair of pistons.

12. The pump of claim 9 which additionally comprises a servo mechanism to turn said first shaft according to a program.

* * * * *